United States Patent
Schnell et al.

(10) Patent No.: US 12,541,502 B2
(45) Date of Patent: Feb. 3, 2026

(54) METHODS AND APPARATUSES FOR IMPROVING THE UTILIZATION OF STATE MACHINES IN A DISTRIBUTED SYSTEM

(71) Applicant: Change Healthcare Holdings, LLC, Nashville, TN (US)

(72) Inventors: Evan Schnell, North Oaks, MN (US); Albert Hives, Oakland, CA (US); Divya Kosaraju, Dublin, CA (US); Chris Patterson, Oakland, CA (US)

( * ) Notice: Subject to any disclaimer, the term of this patent is extended or adjusted under 35 U.S.C. 154(b) by 1509 days.

(21) Appl. No.: 15/062,791

(22) Filed: Mar. 7, 2016

(65) Prior Publication Data

US 2017/0255668 A1 Sep. 7, 2017

(51) Int. Cl.
- *G06F 16/23* (2019.01)
- *G06F 16/176* (2019.01)
- *G06F 16/27* (2019.01)

(52) U.S. Cl.
CPC ...... *G06F 16/2379* (2019.01); *G06F 16/1774* (2019.01); *G06F 16/2343* (2019.01); *G06F 16/27* (2019.01); *G06F 16/273* (2019.01); *G06F 2201/855* (2013.01)

(58) Field of Classification Search
CPC .......................... G06F 16/2343; G06F 16/2379
See application file for complete search history.

(56) References Cited

U.S. PATENT DOCUMENTS

| | | | | |
|---|---|---|---|---|
| 5,410,697 A | * | 4/1995 | Baird | G06F 12/0815 710/200 |
| 5,805,824 A | * | 9/1998 | Kappe | G06F 16/24565 709/242 |
| 6,243,702 B1 | * | 6/2001 | Bamford | G06F 9/466 |
| 8,396,831 B2 | * | 3/2013 | Larson | G06F 16/2322 707/638 |

(Continued)

OTHER PUBLICATIONS

Berenson et al., "A Critique of Ansi SQL Isolation Levels," ACM SIGMOD Record, vol. 24, No. 2, pp. 1-10, (1995). Retrieved Jul. 16, 2019 from https://dl.acm.org/citation.cfm?id=223785. (Year: 1995).*

(Continued)

*Primary Examiner* — Marc S Somers
(74) *Attorney, Agent, or Firm* — MARSHALL, GERSTEIN & BORUN LLP

(57) ABSTRACT

Embodiments are disclosed for improving throughput in a distributed transaction processing system. In the context of a method, an example embodiment includes receiving information regarding a change in state of a particular transaction recorded by the distributed transaction processing system. This example embodiment of the method further includes updating, by state machine query circuitry of a networked device within the distributed transaction processing system and based on the received information, a state of a primary state machine associated with the particular transaction. Finally, the example embodiment of the method further includes updating, by state machine query circuitry of a (Continued)

networked device within the distributed transaction processing system and based on the received information, a state of a primary state machine associated with the particular transaction. Corresponding apparatuses and computer program products are also provided.

19 Claims, 7 Drawing Sheets

(56) References Cited

U.S. PATENT DOCUMENTS

| | | | | |
|---|---|---|---|---|
| 9,910,742 | B1* | 3/2018 | Faibish | G06F 16/2379 |
| 2005/0049945 | A1* | 3/2005 | Bourbonnais | G06F 16/27 |
| | | | | 705/30 |
| 2006/0168080 | A1* | 7/2006 | Surlaker | H04L 1/1874 |
| | | | | 709/207 |
| 2010/0191884 | A1* | 7/2010 | Holenstein | G06F 11/2094 |
| | | | | 710/200 |
| 2011/0145201 | A1* | 6/2011 | Holst | G06F 11/2064 |
| | | | | 707/655 |
| 2012/0102006 | A1* | 4/2012 | Larson | G06F 16/1865 |
| | | | | 707/703 |
| 2013/0054525 | A1* | 2/2013 | Megginson | G06F 16/273 |
| | | | | 707/624 |
| 2014/0379586 | A1* | 12/2014 | Sawyer | H04L 67/00 |
| | | | | 705/301 |
| 2015/0237157 | A1* | 8/2015 | Wang | G06F 16/278 |
| | | | | 714/4.11 |
| 2015/0301901 | A1* | 10/2015 | Rath | G06F 16/25 |
| | | | | 707/634 |
| 2015/0381549 | A1* | 12/2015 | Word | H04L 67/42 |
| | | | | 709/203 |

OTHER PUBLICATIONS

AMQP V1 Transport, OASIS Standard, Oct. 29, 2012, retrieved Jan. 21, 2020 from https://web.archive.org/web/20130105104721/http://docs.oasis-open.org:80/amqp/core/v1.0/amqp-core-transport-v1.0.html (Year: 2013).*

Advanced Message Queuing Protocol, Wikipedia, retrieved Jan. 21, 2020 from https://web.archive.org/web/20150913110336/https://en.wikipedia.org/wiki/Advanced_Message_Queuing_Protocol (Year: 2015).*

* cited by examiner

METHODS AND APPARATUSES FOR IMPROVING THE UTILIZATION OF STATE MACHINES IN A DISTRIBUTED SYSTEM

TECHNOLOGICAL FIELD

Example embodiments of the present invention relate generally to distributed computing and, more particularly, to methods and apparatuses for improving the utilization of state machines in a distributed system.

BACKGROUND

The use of state machines is critical in distributed architectures such as those used for transaction processing systems. In this regard, the term "state machine" refers to a data structure that can be in any number of different states, but which is in only one state at a time. The state that the data structure is in at a given point in time describes the status at the given time of the system represented by the state machine. A fundamental requirement for implementing a state machine in a distributed system, then, is that the implementation must leverage a locking procedure that prevents multiple entities from concurrently modifying the state machine; this ensures that the state machine is in only one state at a time and avoids possible data corruption (e.g., unintended transitions in the state of the state machine) or read errors caused by multiple entities interacting with the state machine in parallel.

The act of maintaining this lock forces a particular usage pattern on the persistent representation of the state machine. Specifically, maintaining a strong lock for each operation involving the state machine prevents other operations from acting upon the state machine. It becomes very expensive to view several state machine instances collectively (as might occur in a SQL Where clause), because even viewing the state machine instances prevents other processes from interacting with the state machine instances. However, in a distributed system, troubleshooting applications need to perform searches across state machines in near-real-time in order to assess the state of the overall system, which blocks other processes from accessing the state machines, and in turn greatly reduces the throughput of the entire system. Thus, traditional approaches for protecting the integrity of state machines undermine the effectiveness of the distributed architecture.

While modern Lambda architectures and extensions can provide a data store (usually created in a batch process) that can be queried for analytics (thus removing the need for some queries that would otherwise apply locks to one or more state machines), this batch data store is somewhat disconnected both temporally and technologically. Such approaches are complicated to maintain even for relatively simple use cases.

BRIEF SUMMARY

Example embodiments described herein address the above deficiencies and provide methods and apparatuses that facilitate more efficient utilization of a distributed transaction processing system while at the same time maintaining the integrity of the state machines used in the distributed transaction processing system.

In a first example embodiment, a method is provided for improving throughput in a distributed transaction processing system. The method includes receiving information regarding a change in state of a particular transaction recorded by the distributed transaction processing system. The method further includes updating, by state machine query circuitry of a networked device within the distributed transaction processing system and based on the received information, a state of a primary state machine associated with the particular transaction. In response to updating the state of the primary state machine, the method includes updating, by state machine query circuitry of a networked device within the distributed transaction processing system, a state of a secondary state machine having a schema identical to that of the primary state machine, wherein the secondary state machine is also associated with the particular transaction.

In some embodiments, the method further includes receiving a request for information regarding a current state of the particular transaction, retrieving, by state machine query circuitry of a networked device within the distributed transaction processing system, state information from the secondary state machine, and returning, by communications circuitry of a networked device within the distributed transaction processing system, the retrieved state information.

In some embodiments, updating the state of the primary state machine includes locking the primary state machine using a serializable isolation level lock, transitioning the state of the primary state machine based on the received information regarding the change in state of the particular transaction, incrementing a version number associated with the primary state machine, causing transmission of a secondary state machine transition message, wherein the secondary state machine transition message includes an indication of the incremented version number associated with the primary state machine, and releasing the serializable isolation level lock on the primary state machine.

In some such embodiments, the secondary state machine transition message may comprise an Advanced Messaging Query Protocol (AMQP) compliant message.

In some embodiments, updating the state of the secondary state machine includes receiving a secondary state machine transition message, locking the secondary state machine using a read-committed isolation level lock, retrieving, from the state machine transition message, a version number associated with the primary state machine, retrieving, from the secondary state machine, a version number associated with the secondary state machine, comparing a version number of the primary state machine to a version number associated with the secondary state machine, performing a secondary state machine update operation based on the comparison of the version number of the primary state machine to the version number associated with the secondary state machine, and releasing the read-committed isolation level lock on the secondary state machine.

In some such embodiments, the secondary state machine transition message comprises an AMQP compliant message.

In an instance in which the version number associated with the primary state machine is less than or equal to the version number associated with the secondary state machine, performing the secondary state machine update operation may comprise discarding the secondary state machine transition message.

Alternatively, in an instance in which the version number associated with the primary state machine is greater than the version number associated with the secondary state machine but not in sequential order, performing the secondary state machine update operation may include re-queueing the secondary state machine transition message.

As yet another alternative, in an instance in which the version number associated with the primary state machine is greater than the version number associated with the secondary state machine and in sequential order, performing the secondary state machine update operation may include transitioning the state of the secondary state machine based on the received secondary state machine transition message.

In some embodiments, the primary state machine and the secondary state machine are modelled by a relational database management system (RDBMS).

In a second example embodiment, an apparatus is provided for improving throughput in a distributed transaction processing system. The apparatus includes at least one processor and at least one memory storing computer-executable instructions, that, when executed by the at least one processor, cause the apparatus to receive information regarding a change in state of a particular transaction recorded by the distributed transaction processing system, and update, based on the received information, a state of a primary state machine associated with the particular transaction. In response to updating the state of the primary state machine, the computer-executable instructions, when executed by the at least one processor, cause the apparatus to update a state of a secondary state machine having a schema identical to that of the primary state machine, wherein the secondary state machine is also associated with the particular transaction.

In some embodiments, the apparatus may receive a request for information regarding a current state of the particular transaction, and the computer-executable instructions, when executed by the at least one processor, cause the apparatus to retrieve state information from the secondary state machine and return the retrieved state information.

In some embodiments, the computer-executable instructions, when executed by the at least one processor, cause the apparatus to update the state of the primary state machine by causing the apparatus to lock the primary state machine using a serializable isolation level lock, transition the state of the primary state machine based on the received information regarding the change in state of the particular transaction, increment a version number associated with the primary state machine, cause transmission of a secondary state machine transition message, wherein the secondary state machine transition message includes an indication of the incremented version number associated with the primary state machine, and release the serializable isolation level lock on the primary state machine.

In some such embodiments, the secondary state machine transition message may comprise an AMQP compliant message.

In some embodiments, the computer-executable instructions, when executed by the at least one processor, cause the apparatus to update the state of the secondary state machine by receiving a secondary state machine transition message and causing the apparatus to lock the secondary state machine using a read-committed isolation level lock, retrieve, from the state machine transition message, a version number associated with the primary state machine, retrieve, from the secondary state machine, a version number associated with the secondary state machine, compare a version number of the primary state machine to a version number associated with the secondary state machine, perform a secondary state machine update operation based on the comparison of the version number of the primary state machine to the version number associated with the secondary state machine, and release the read-committed isolation level lock on the secondary state machine.

In some such embodiments, the secondary state machine transition message comprises an AMQP compliant message.

In an instance in which the version number associated with the primary state machine is less than or equal to the version number associated with the secondary state machine, performing the secondary state machine update operation may comprise discarding the secondary state machine transition message.

Alternatively, in an instance in which the version number associated with the primary state machine is greater than the version number associated with the secondary state machine but not in sequential order, performing the secondary state machine update operation may include re-queueing the secondary state machine transition message.

As yet another alternative, in an instance in which the version number associated with the primary state machine is greater than the version number associated with the secondary state machine and in sequential order, performing the secondary state machine update operation may include transitioning the state of the secondary state machine based on the received secondary state machine transition message.

In some embodiments, the primary state machine and the secondary state machine are modelled by a relational database management system (RDBMS).

In a third example embodiment, a computer program product comprising at least one non-transitory computer-readable storage medium is provided for improving throughput in a distributed transaction processing system. The at least one non-transitory computer-readable storage medium storing computer-executable instructions that, when executed, cause an apparatus to receive information regarding a change in state of a particular transaction recorded by the distributed transaction processing system, and update, based on the received information, a state of a primary state machine associated with the particular transaction. In response to updating the state of the primary state machine, the computer-executable instructions, when executed, cause the apparatus to update a state of a secondary state machine having a schema identical to that of the primary state machine, wherein the secondary state machine is also associated with the particular transaction.

In some embodiments, the apparatus may receive a request for information regarding a current state of the particular transaction, and the computer-executable instructions, when executed, cause the apparatus to retrieve state information from the secondary state machine and return the retrieved state information.

In some embodiments, the computer-executable instructions, when executed, cause the apparatus to update the state of the primary state machine by causing the apparatus to lock the primary state machine using a serializable isolation level lock, transition the state of the primary state machine based on the received information regarding the change in state of the particular transaction, increment a version number associated with the primary state machine, cause transmission of a secondary state machine transition message, wherein the secondary state machine transition message includes an indication of the incremented version number associated with the primary state machine, and release the serializable isolation level lock on the primary state machine.

In some such embodiments, the secondary state machine transition message may comprise an AMQP compliant message.

In some embodiments, the computer-executable instructions, when executed, cause the apparatus to update the state of the secondary state machine by receiving a secondary state machine transition message and causing the apparatus to lock the secondary state machine using a read-committed isolation level lock, retrieve, from the state machine transition message, a version number associated with the primary state machine, retrieve, from the secondary state machine, a version number associated with the secondary state machine, compare a version number of the primary state machine to a version number associated with the secondary state machine, perform a secondary state machine update operation based on the comparison of the version number of the primary state machine to the version number associated with the secondary state machine, and release the read-committed isolation level lock on the secondary state machine.

In some such embodiments, the secondary state machine transition message comprises an AMQP compliant message.

In an instance in which the version number associated with the primary state machine is less than or equal to the version number associated with the secondary state machine, performing the secondary state machine update operation may comprise discarding the secondary state machine transition message.

Alternatively, in an instance in which the version number associated with the primary state machine is greater than the version number associated with the secondary state machine but not in sequential order, performing the secondary state machine update operation may include re-queueing the secondary state machine transition message.

As yet another alternative, in an instance in which the version number associated with the primary state machine is greater than the version number associated with the secondary state machine and in sequential order, performing the secondary state machine update operation may include transitioning the state of the secondary state machine based on the received secondary state machine transition message.

In some embodiments, the primary state machine and the secondary state machine are modelled by a relational database management system (RDBMS).

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
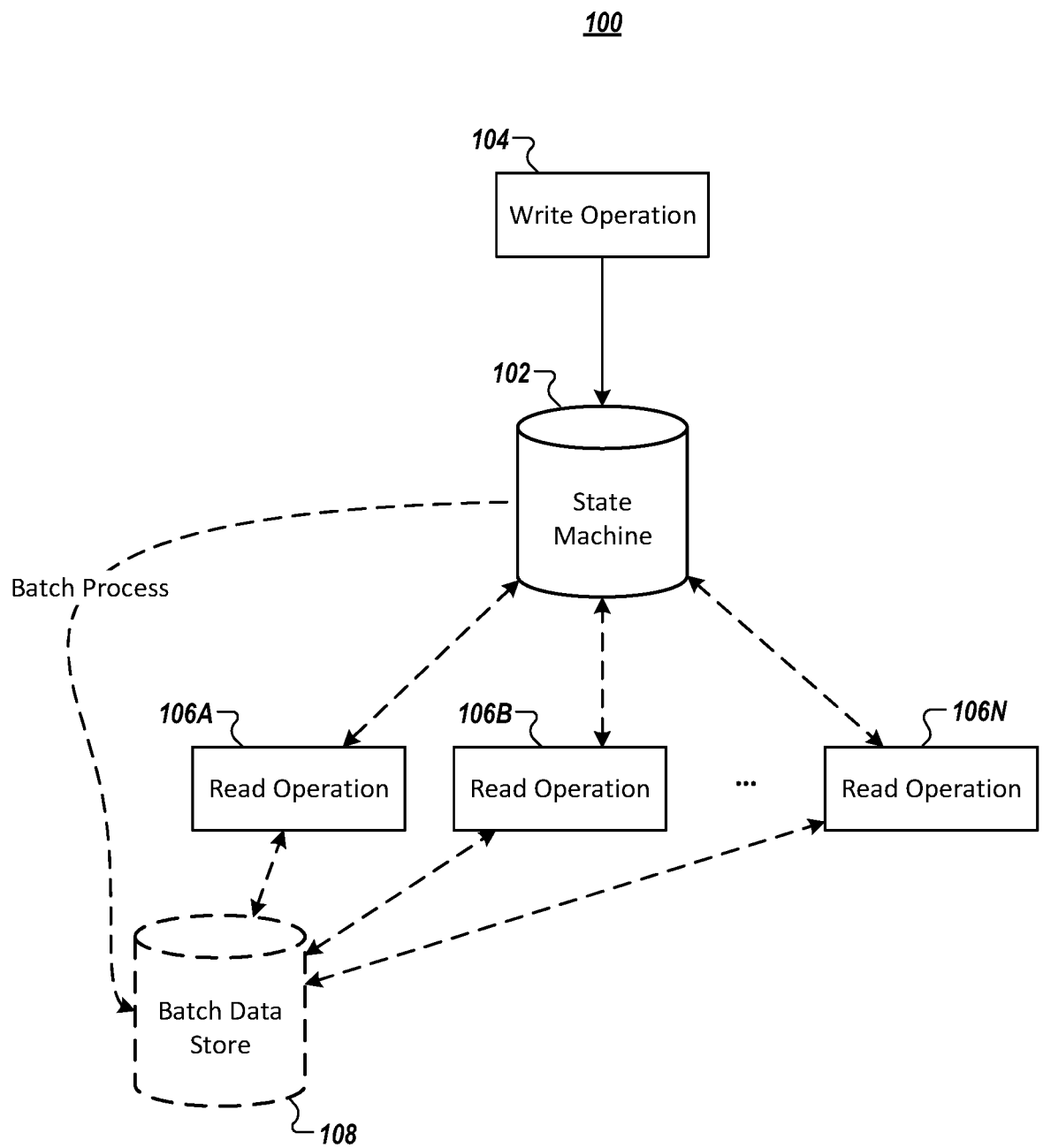
FIG. 1 illustrates a schematic diagram of a traditional state machine implementation within a distributed system.

As mentioned above, traditional approaches for protecting the integrity of state machines undermine the effectiveness of the distributed architecture. Consider, for instance, the implementation shown in FIG. 1, which illustrates a schematic diagram of traditional state machine implementation within a distributed system. A state machine 102 may be accessed by a write operation 104, which requires a strong lock to prevent data corruption or read errors that might otherwise arise from multiple current processes accessing the state machine 102. However, there may also be any number of other processes that require access to the state machine 102, such as read operations 106A-106N (it will be understood that additional write operations may also request access to the state machine 102). By using a strong locking protocol, each operation accessing the state machine 102 will block all other operations. Because larger processes can therefore be halted awaiting an operation that touches a state machine, blocking of this nature can greatly reduce the efficiency and the throughput of the distributed system as a whole.

In some embodiments, a batch data store 108 may be created using modern Lambda architectures, but doing so would typically occur in a batch process that occurs periodically or at times of low system utilization. While that batch data store 108 can thereafter be queried for analytics (thus potentially removing the need for read operations 106A-106N to access the state machine 102 itself), reliance on Lambda architectures in this way has several downsides. First, with use of a batch data store 108 in this fashion, synchronicity between the real-time state machine and the batch store can be hard to maintain, as batch processing necessarily establishes that the data contained in the batch data store 108 will become stale. Second, using Lambda architectures in this way does not simply copy the output of processing operations to a second location, but would instead require processing logic to be engineered twice (once to implement the state machine, and a second time to populate the batch data store). And third, in implementations having an Advanced Message Queueing Protocol (AMQP)-based enterprise service bus (ESB)-style architecture, there is no natural way to implement a batch process without adding another library with associated complexity. Accordingly, use of Lambda architectures would deteriorate the quality of the retrievable data and would add a layer of complexity to the implementation in order to harmonize use of the state machine 102 with a batch data store 108 that does not have the same schema.

Figure 2:
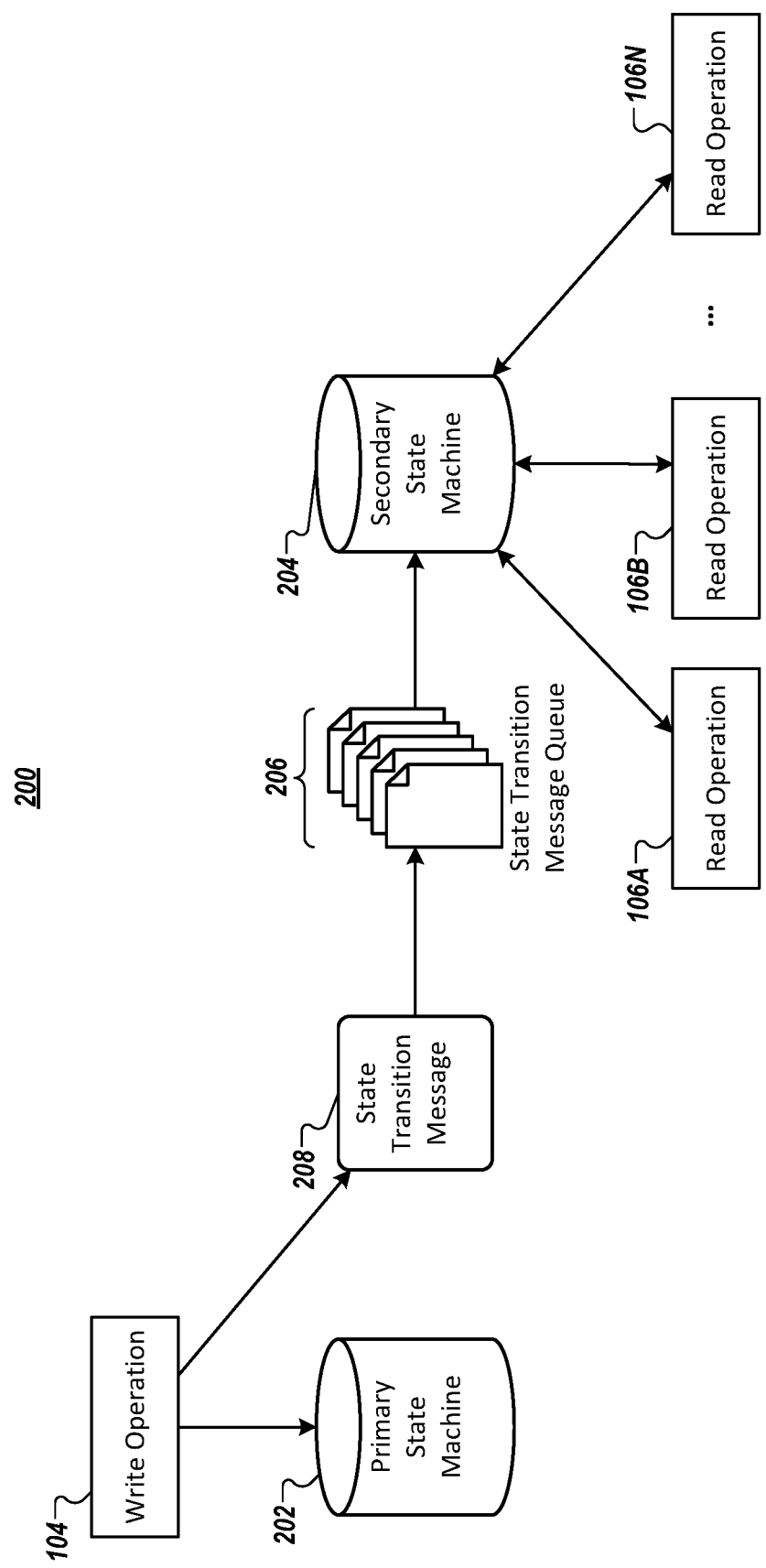
FIG. 2 illustrates a schematic diagram of an example state machine implementation within a distributed system in accordance with some example embodiments described herein.

Example embodiments disclosed herein avoid these problems and illustrate methods and apparatuses that facilitate more efficient utilization of a distributed system, while at the same time maintaining the integrity of the state machines used in the system. As shown in FIG. 2, example embodiments provide a distributed software architecture leveraging a first data structure (e.g., a relational database management system (RDBMS)) that models a primary state machine 202 and a state transition message queue 206 for event and command distribution (which in some embodiments may be implemented using an AMQP compliant message queue processor configured to transmit state transition messages 208). Accordingly, example methods and apparatuses maintain integrity of primary state machine 202 through use of a strong lock on the primary state machine 202. In such embodiments, all access to the data structure representing the primary state machine 202 uses a serializable lock (e.g., a SQL Serializable lock on a row in a SQL RDBMS that models the primary state machine 202). To enable orthogonal reads in a simple, low-cost manner, a secondary state machine 204 is modelled by another data structure (e.g., another RDBMS) that has the same schema as the data structure modelling the primary state machine 202. It should be understood that the term "schema" as used herein may refer to a collection of database objects, such that two data structures having the same schema have the same collection of database objects. All access to the secondary state machine 204 shall use a read-committed isolation level, which has fewer locking issues than a serializable lock, thus allowing for more aggregate operations on the secondary state machine 204 than would be possible on the primary state machine 202. In this manner, while the true state of the primary state machine 202 is maintained with a strict lock, the secondary state machine 204 is maintained using a less strict model. Anything needing to read the data from the state machine would read from the secondary state machine 204 without impacting performance of the primary state machine 202.

However, without using a strict lock, the secondary state machine 204 can become stale. To avoid this problem, the distributed system may utilize an eventual consistency solution based upon optimistic locking and messaging-based replay. Specifically, optimistic locking relies on version checking to avoid conflicting data modifications without exclusive locks. To implement optimistic locking here, the distributed system may version each change to the primary state machine and identify a corresponding version in each state transition message 208 sent to the secondary state machine 204. If a version number associated with the primary state machine 202 in a given state transition message 208 is lower than (or equal to) a version number associated with the secondary state machine, the event message is discarded as stale or a duplicate. If the version number associated with the primary state machine is higher than the version number associated with the secondary state machine but the two version numbers are out of sequential order, the message is re-queued for redelivery in accordance with the AMQP protocol (one or more intervening state transitions must be applied to the secondary state machine first). The state transition message 208 is only processed if the version number identified in the state transition message 208 is in proper sequential order from the version number associated with the secondary state machine 204.

Accordingly, through use of a secondary state machine and, in some cases, optimistic locking and messaging-based replay, various embodiments disclosed herein provide an elegant solution that increases efficiency of a distributed system. Example methods and apparatuses that implement these concepts are described in greater detail below.

System Architecture

Methods, apparatuses, and computer program products of the present invention may be embodied by any of a variety of devices. Example embodiments may include a plurality of networked devices operating in a distributed system. In this regard, it will be understood that the term "distributed system" refers to a plurality of networked devices in which some components are shared among the devices. In an example distributed transaction processing system, user interface processing may be performed by end-user terminals, while business processing may be performed by remote servers, and database access may be facilitated by still other devices or sets of devices. Example distributed systems may utilize any of a variety of fixed terminals, such as desktop computers, mainframe devices, kiosks, or the like. Similarly, example distributed systems may also utilize any of a variety of mobile terminals, such as a portable digital assistant (PDA), mobile telephone, smartphone, laptop computer, tablet computer, or any combination of the aforementioned devices.

As noted above, one key component used in many distributed systems is that of a state machine. In many implementations, a state machine may be modelled using a relational database management system (RDBMS), and a message queue processor instance may be used to effect state transitions in the modelled state machine.

Figure 3:
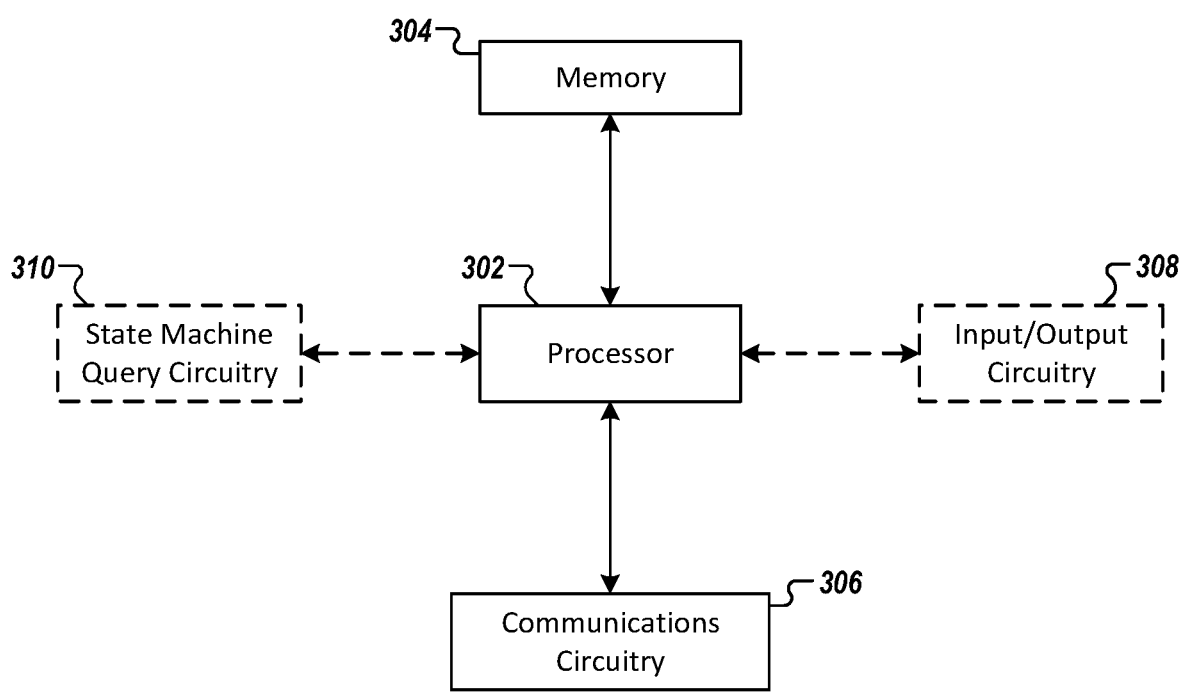
FIG. 3 illustrates a schematic block diagram of example circuitry embodying a networked device that may perform operations in accordance with some example embodiments described herein.

Turning to FIG. 3, an example apparatus 300 is illustrated that may represent a basic set of components of a given networked device in a distributed system. The apparatus 300 may include a processor 302, a memory 304, and communications circuitry 306. Some of the networked devices may further include input/output circuitry 308 for interacting with a user and state machine query circuitry 310 for interacting with a particular state machine. The apparatus 300 may be configured to execute the operations described below in connection with FIGS. 4-7. Although these components 302-310 are described with some functional descriptors, it should be understood that the particular implementations necessarily include the use of particular hardware. It should also be understood that certain of these components 302-310 may include similar or common hardware. For example, the state machine query circuitry 310 may leverage use of the processor 302, memory 304, or communications circuitry 306, to perform its associated functions, and duplicate hardware is not required for the distinct components of the apparatus 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 300.

In some embodiments, the processor 302 (and/or coprocessor or any other processing circuitry assisting or otherwise associated with the processor) may be in communication with the memory 304 via a bus for passing information among components of the apparatus. The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments contemplated herein.

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communication interface 306 may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 300 may include input/output circuitry 308 that may, in turn, be in communication with processor 302 to provide output to a user and, in some embodiments, to receive an indication of user input. The input/output circuitry 308 may comprise a user interface and may include a display that may include a web user interface, a mobile application, a client device, or the like. In some embodiments, the input/output circuitry 308 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 300 may also comprise state machine query circuitry 310, which includes hardware components designed to interact with a state machine. State machine query circuitry 310 may utilize processor 302, memory 304, or any other hardware component included in the apparatus 300 to interact with a given state machine. State machine query circuitry 310 may further utilize communications circuitry 106 to communicate with the device hosting a particular instance of a state machine.

State machine query circuitry 310 may utilize processing circuitry, such as the processor 302, to facilitate performance of its various operations, and may utilize memory 304 to store state computer instructions that, when executed, cause the state machine query circuitry 310 to perform those operations and may store information retrieved in response to interaction with the state machine. It should be appreciated that, in some embodiments, state machine query circuitry 310 may include a separate processor, specially configured field programmable gate array (FPGA), or application specific interface circuit (ASIC) to perform the above-described functions. State machine query circuitry 310 is therefore implemented using hardware components of the apparatus configured by either hardware or software for implementing these planned functions.

As described above and as will be appreciated based on this disclosure, example embodiments may be implemented by a distributed system having a plurality of networked devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain networked devices embodied by apparatus 300 as described in FIG. 3, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example networked device (e.g., apparatus 300) that may be utilized in a distributed system to facilitate more efficient utilization of the distributed system, example embodiments of the present invention are described below in connection with a series of flowcharts.

Operations for Improving Efficiency of a Distributed System

Figure 4:
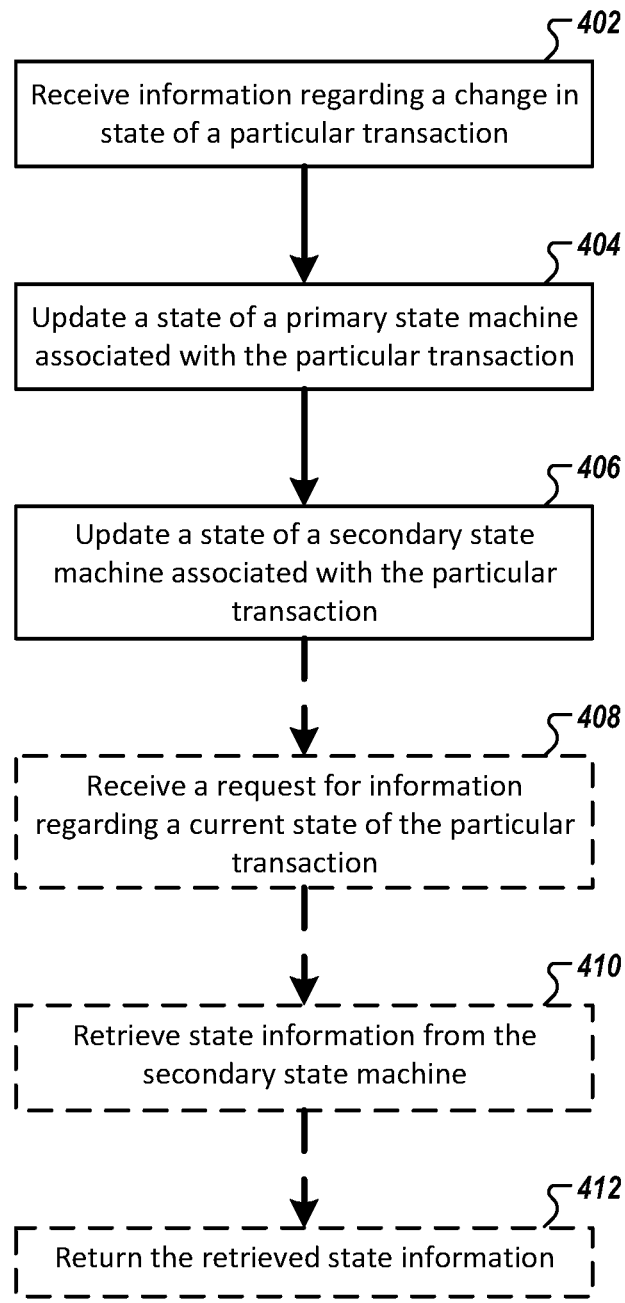
FIG. 4 illustrates a flowchart describing example operations performed by a networked device to improve utilization of a state machine in a distributed transaction processing system, in accordance with some example embodiments described herein.
Figure 5:
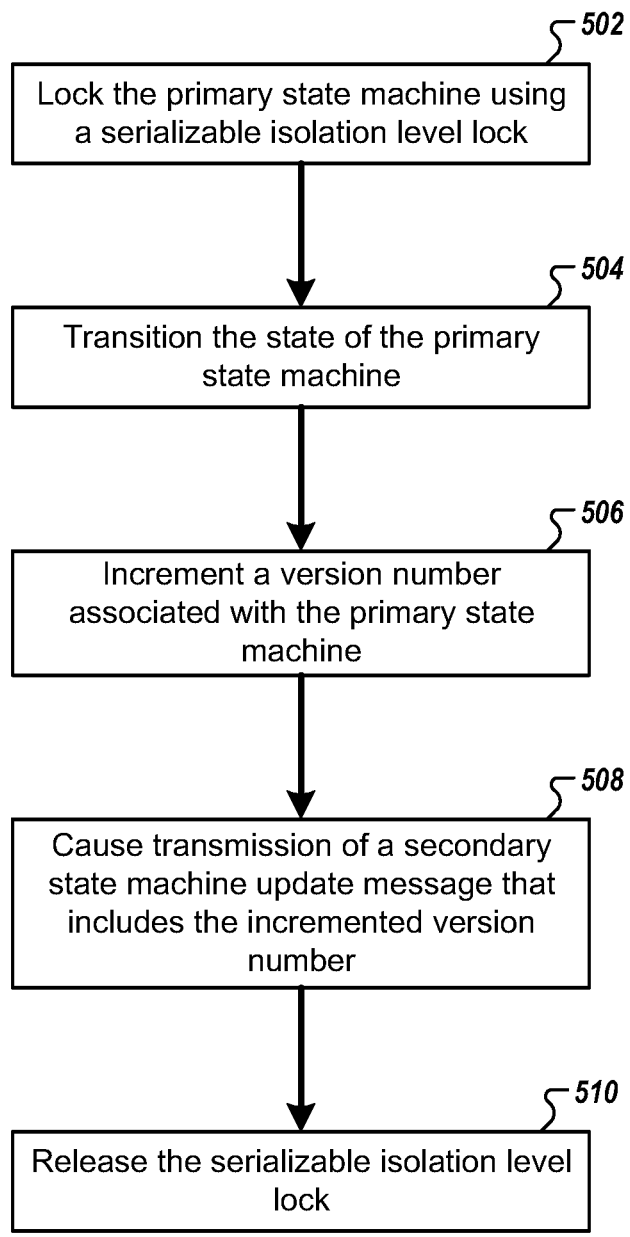
FIG. 5 illustrates a flowchart describing example operations performed by a networked device to update a primary state machine, in accordance with some example embodiments described herein.
Figure 6:
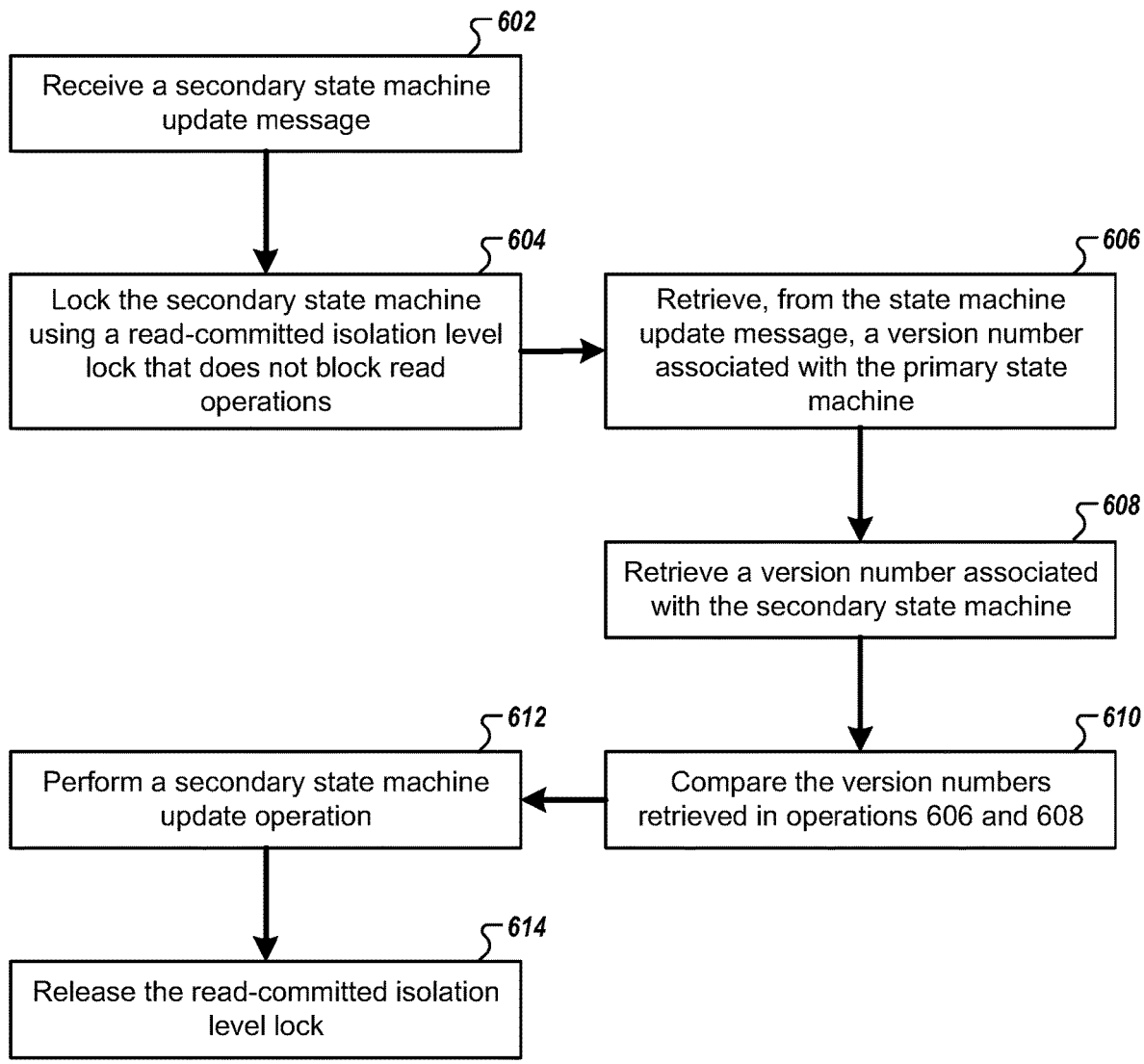
FIG. 6 illustrates a flowchart describing example operations performed by a networked device to process a secondary state machine transition message, in accordance with some example embodiments described herein.

Turning to FIGS. 4, 5, and 6, flowcharts are illustrated that contain operations performed by a networked device to improve utilization of a state machine within a distributed system. The operations illustrated in FIGS. 4, 5, and 6 may, for example, be performed by, with the assistance of, and/or under the control of an apparatus 300 embodying a networked device within a distributed system, and more particularly through the use of one or more of processor 302, memory 304, communications circuitry 306, input/output circuitry 308, and state machine query circuitry 310.

Turning first to FIG. 4, example operations are provided for improving utilization of state machines in a distributed transaction processing system.

In operation 402 the apparatus 300 includes means, such as processor 302, communications circuitry 306, input/output circuitry 308, or the like, for receiving information regarding a change in state of a particular transaction recorded by the distributed transaction processing system. In some implementations, this information may be received from a user (e.g., via input/output circuitry 308), although the information may alternatively be received from another device within the distributed environment (e.g., via communications circuitry 306), or may be derived by the apparatus 300 itself upon occurrence of some other event.

For instance, an example distributed transaction processing system may comprise a comprehensive orders and results management system. A basic transaction may comprise an order (e.g., an electronic health record) that is be received from a first party (e.g., a doctor), routed to a second party (e.g., a lab), which generates a result (e.g., a lab report) that is then transmitted back to the first party. The distributed transaction processing system may facilitate the interactions between the first party and the second party to facilitate this transaction. Various states may exist for any given transaction within this context. In this example transaction, some example states may be the following: a state indicating that an order has be placed by the first party; a state indicating that the order has been canceled by the first party; a state indicating that the order has been transmitted to the second party; and a state indicating that the result has been generated by the second party; and a state indicating that the result has been transmitted back to the first party. Upon creation of a new state machine associated with the new transaction, the state machine would likely begin in the state indicating that the order has been placed. From there, information regarding a change in state may be received by the apparatus 300 in response to various milestones occurring. For instance, cancelation of the order by the first party may trigger an automated message to the apparatus 300 that the state of the particular transaction has changed. Similarly, when the distributed transaction processing system delivers the order to the second party, it may simultaneously deliver a message indicating the change in state of the transaction to the apparatus 300.

In operation 404 the apparatus 300 includes means, such as state machine query circuitry 310 or the like, for updating, based on the received information, a state of a primary state machine associated with the particular transaction. Specific example operations performed to update the state of the primary state machine are described in greater detail below in connection with FIG. 5, and for the purposes of describing operation 404, it is sufficient to recognize that the embodiments described herein contemplate the use of both a primary state machine and a secondary state machine to improve throughput of the distributed transaction processing system, and that the primary state machine represents the true state of the particular transaction.

In operation 406 the apparatus 300 includes means, such as state machine query circuitry 310 or the like, for, in response to updating the state of the primary state machine, updating a state of a secondary state machine having a schema identical to that of the primary state machine, wherein the secondary state machine is also associated with the particular transaction. Specific example operations performed to update a state of a secondary state machine are described in greater detail below in connection with FIG. 6, and it should be sufficient to recognize for description of operation 406 that the secondary state machine facilitates subsequent read operations to determine the state of the particular transaction without requiring placement of a lock on the primary state machine itself. By removing the need to lock the primary state machine, the distributed transaction processing system avoids a bottleneck that traditionally impacts distributed systems that utilize state machines.

Operations 408-412 are optional insofar as they illustrate the subsequent utilization of the secondary state machine, which theoretically is not required to implement example embodiments described herein (such as when there are never any queries for information regarding the state of a particular transaction).

In optional operation 408 the apparatus 300 includes means, such as communications circuitry 306, input/output circuitry 308, or the like, for receiving a request for information regarding a current state of the particular transaction. This request may be received from a user (via input/output circuitry 308) or another device (via communications circuitry 306), or from a user via an intermediary device within the distributed transaction processing system.

In optional operation 410 the apparatus 300 includes means, such as state machine query circuitry 310 or the like, for retrieving state information from the secondary state machine. In this regard, retrieving state information may include locking the secondary state machine using a read-committed isolation level lock, accessing the secondary state machine to determine its state and perform a functional read operation, and releasing the read-committed isolation level lock on the secondary state machine. In this regard, it should be understood that, unlike a serializable isolation level lock, a read-committed isolation level lock does not monopolize use of the state machine. Read-committed isolation, and other less restrictive isolation levels do not prevent clients (threads) from reading a record while it is being updated by another client (thread). This fact enables the secondary state machine to support many concurrent readers and writers without readers blocking writers. Read-committed isolation level locking does still prevent two clients from updating the same row at the same time Finally, in optional operation 412 the apparatus 300 includes means, such as memory 304, communications circuitry 306, input/output circuitry 308, state machine query circuitry 310, or the like, for returning the retrieved state information. In some embodiments, this information may be transmitted to a user (via input/output circuitry 308) or another device (via communications circuitry 306), or to a user via an intermediary device within the distributed transaction processing system.

Turning next to FIG. 5, example operations are described for updating a primary state machine, in accordance with example embodiments described herein.

In operation 502 the apparatus 300 includes means, such as processor 302, state machine query circuitry 310, or the like, for locking the primary state machine using a serializable isolation level lock. Serializable isolation level is generally regarded as the highest isolation level, and ensures exclusive access to the primary state machine until the serializable isolation level lock is released.

In operation 504 the apparatus 300 includes means, such as state machine query circuitry 310 or the like, for transitioning the state of the primary state machine based on the received information regarding the change in state of the particular transaction. The exact procedure for transitioning the state of the primary state machine depends on the specific data structure used to represent the primary state machine. When, for example, a RDMBS row is used to represent the primary state machine, transitioning the state of the primary state machine may comprise performing one or more write operations to update one or more data fields in the row. For instance, if the RDBMS row includes a series of data fields that each represent different possible states within a finite state machine, then transitioning the state machine may be as simple as updating the fields corresponding to the current state of the state machine and to the new state to which the state machine is transitioning. It will be understood that using a different data structure to represent the primary state machine will require a different set of steps be taken to effect transitioning of the state of the primary state machine.

In operation 506 the apparatus 300 includes means, such as state machine query circuitry 310, or the like, for incrementing a version number associated with the primary state machine. In this regard, the data structure representing the primary state machine may have a data field storing a current version number. Incrementing the version number associated with the primary state machine may therefore require updating this separate data field in the data structure. In other embodiments, a data field indicating a version number of the primary state machine may be stored elsewhere but linked to the data structure representing the primary state machine. In either embodiment, incrementing the version number comprises a simple mathematical procedure of adding a predetermined value (e.g., 1) to the value stored in the data field representing the version number associated with the primary state machine.

In operation 508 the apparatus 300 includes means, such as communications circuitry 306, input/output circuitry 308, state machine query circuitry 310, or the like, for causing transmission of a secondary state machine transition message, wherein the secondary state machine transition message includes an indication of the incremented version number associated with the primary state machine. It will be noted that the secondary state machine transition message may in some embodiments utilize a messaging protocol having two primary distinguishing factors: (1) it must be designed to guarantee message delivery (e.g., via the ability to re-queue transmissions); and (2) each message can be consumable by only one consumer (thus preventing errant additional state changes in the secondary state machine). In some embodiments, the messaging protocol may comprise AMQP. The secondary state machine transition message identifies a state to which the primary state machine is transitioning (or any information suitable to derive the state to which the primary state machine is transitioning) and further identifies the incremented version number associated with the primary state machine.

In operation 510 the apparatus 300 includes means, such as state machine query circuitry 310, or the like, for releasing the serializable isolation level lock on the primary state machine.

Turning next to FIG. 6, example operations are disclosed for processing a secondary state machine transition message, in accordance with some example embodiments described herein.

In operation 602 the apparatus 300 includes means, such as communications circuitry 306, input/output circuitry 308, or the like, for receiving a secondary state machine transition message. In some embodiments, this secondary state machine transition message may be received as the result of performance of operation 508 above. Accordingly, the secondary state machine transition message may utilize a messaging protocol having two primary distinguishing factors: (1) it must be designed to guarantee message delivery (e.g., via the ability to re-queue transmissions); and (2) each message can be consumable by only one consumer (thus preventing errant additional state changes in the secondary state machine). In some such embodiments, the messaging protocol may comprise AMQP. Moreover, the secondary state machine transition message will identify the state to which a primary state machine has transitioned (or any information suitable to derive the state to which the primary state machine has transitioned) and further identifies the incremented version number associated with the primary state machine.

In operation 604 the apparatus 300 includes means, such as state machine query circuitry 310, or the like, for locking the secondary state machine using a read-committed isolation level lock. As noted previously, a read-committed isolation level lock does not monopolize use of the state machine, and thus retrieving state information from the secondary state machine can occur concurrently with other processes interacting with the secondary state machine.

In operation 606 the apparatus 300 includes means, such as processor 302 or the like, for retrieving, from the state machine transition message, the version number associated with the primary state machine.

In operation 608, the apparatus 300 includes means, such as processor 302, memory 304, communications circuitry 306, state machine query circuitry 310, or the like, for retrieving, from the secondary state machine, a version number associated with the secondary state machine. It should be recognized in this regard that a version number associated with the secondary state machine may be stored in its own data field in the secondary state machine or may be stored elsewhere, but in any event is likely to be stored in similar fashion as the version number associated with the primary state machine.

In operation 610 the apparatus 300 includes means, such as processor 302 or the like, for comparing a version number of the primary state machine to a version number associated with the secondary state machine.

Subsequently, in operation 612, the apparatus 300 includes means, such as state machine query circuitry 310 or the like, for performing a secondary state machine update operation based on the comparison of the version number of the primary state machine to the version number associated with the secondary state machine. The secondary state machine update operation may utilize optimistic locking while performing the secondary state machine update operation. One example procedure for doing this is described below in connection with FIG. 7.

Figure 7:
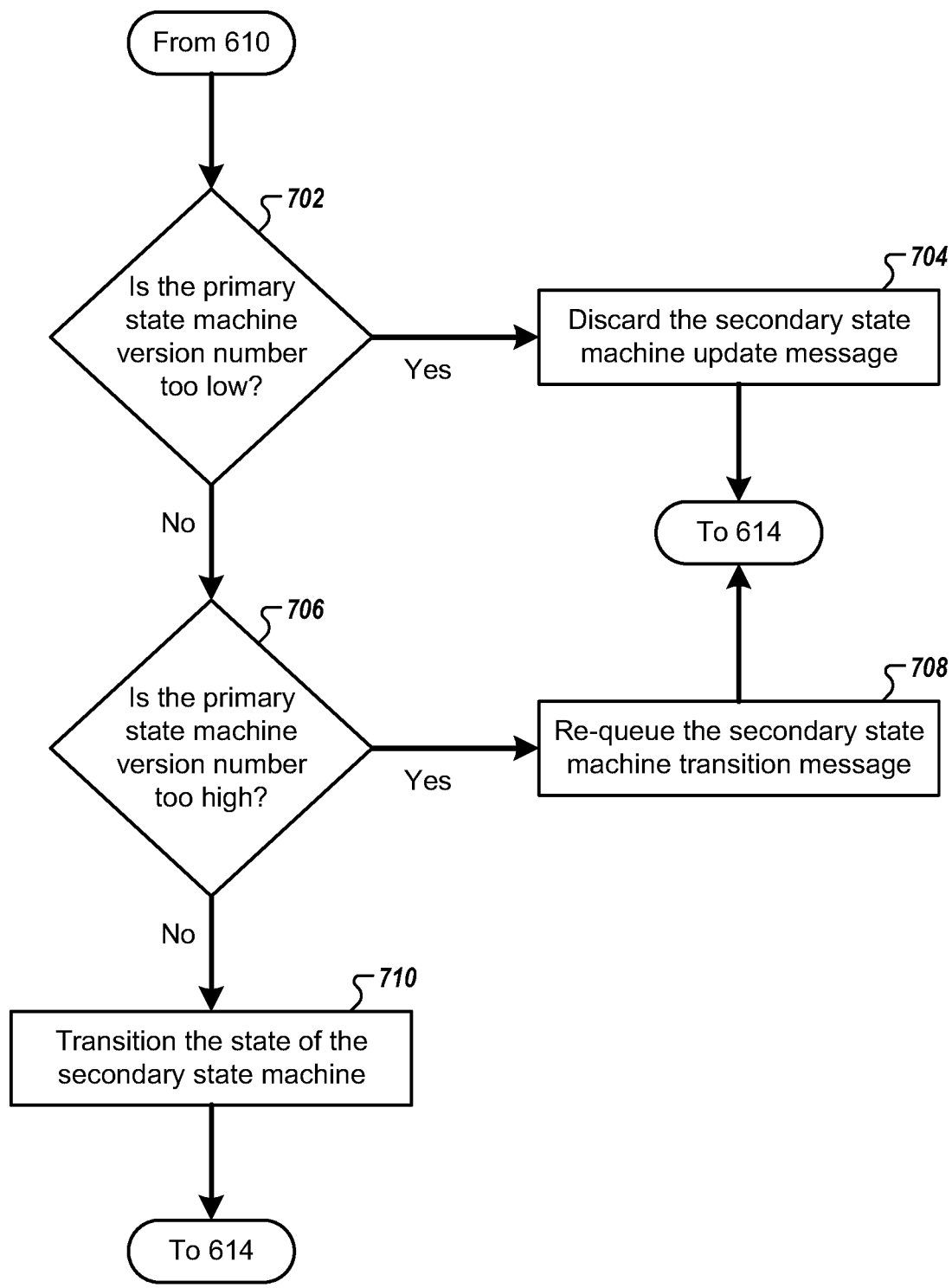
FIG. 7 illustrates a flowchart describing example operations for performing a secondary state machine update operation using optimistic locking and messaging-based replay, in accordance with some example embodiments described herein.

As illustrated in FIG. 7, a more detailed set of example operations are disclosed for performing a secondary state machine update operation using optimistic locking and messaging-based replay.

From operation 610, the procedure may advance to the operations illustrated in FIG. 7. In this regard, it should be understood that the described in connection with operations 702 and 706 may be performed in any order, and are described in one particular order simply for ease of explanation.

Turning to operation 702, the apparatus 300 may include means, such as processor 302 or the like, for determining whether the primary state machine version number is too low. More specifically, this may in some embodiments comprise determining whether the version number associated with the primary state machine is less than or equal to the version number associated with the secondary state machine.

If so, this fact illustrates that the secondary state machine transition message is either stale or a duplicate, and the procedure advances to operation 704, in which the apparatus 300 includes means, such as processor 302, memory 304, or the like, for discarding the secondary state machine transition message.

If, on the other hand, the version number associated with the primary state machine is not less than or equal to the version number associated with the secondary state machine, then the procedure advances to operation 706.

In operation 706 the apparatus 300 includes means, such as processor 302 or the like, for determining whether the primary state machine version number is too high. More specifically, this may in some embodiments comprise determining whether the version number associated with the primary state machine is greater than the version number associated with the secondary state machine but is not in sequential order.

If so, this fact illustrates that the secondary state machine transition message is too new, and the procedure advances to operation 708, in which the apparatus 300 includes means, such as processor 302, memory 304, communications circuitry 306, or the like, for re-queueing the secondary state machine transition message in a state transition message queue 206. By using this messaging-based replay feature, the secondary state machine transition message can be evaluated again at a later time when the version number comparison may indicate that the secondary state machine is ripe for transition to the state identified in the secondary state machine transition message.

If, on the other hand, the version number associated with the primary state machine is not less than or equal to the version number associated with the secondary state machine and is also in sequential order with the version number associated with the secondary state machine, then the procedure may advance to operation 710, in which the apparatus 300 includes means, such as processor 302, memory 304, communications circuitry 306, or the like, for transitioning the state of the secondary state machine based on the secondary state machine transition message. It will be understood that, in similar fashion to the state transition illustrated in operation 504, the exact procedure for transitioning the state of the secondary state machine may vary based on the nature of the specific data structure used to represent the secondary state machine.

After discarding the secondary state machine transition message in operation 704, re-queueing the secondary state machine transition message in operation 708, or transitioning the state of the secondary state machine in operation 710, the procedure returns to operation 614 shown in FIG. 6, in which the apparatus 300 includes means, such as state machine query circuitry 310, or the like, for releasing the read-committed isolation level lock on the secondary state machine.

As described above, example embodiments described herein facilitate more efficient utilization of a distributed system while at the same time maintaining the integrity of the primary state machine used in the system. Example embodiments contemplated herein enable improved throughput of distributed systems by diverting read operations away from primary state machines (thus avoiding the increased potential for blocking caused by repeated access requests to the same state machines). Accordingly, while the true state of the primary state machine can be maintained with a strict lock, the secondary state machine can be maintained using a less strict model facilitating greater read access. As a result, any process needing to read data regarding the state of a transaction can do so quickly from the secondary state machine without impacting performance of the distributed transaction processing system itself FIGS. 4-7 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 300 employing an embodiment of the present invention and executed by a processor of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for providing throughput in a distributed transaction processing system, the computer-implemented method comprising:
   receiving, using one or more processors of the distributed transaction processing system, information regarding a change in state of a particular transaction recorded by the distributed transaction processing system;
   updating, using the one or more processors and based on the received information, a state of a primary state machine associated with the particular transaction by:
      transitioning, using the one or more processors, the state of the primary state machine based on the received information regarding the change in state of the particular transaction;
      incrementing, using the one or more processors, a version number of the primary state machine; and
      causing, using the one or more processors, transmission of a secondary state machine transition message to a secondary state machine, wherein the secondary state machine transition message includes an indication of the incremented version number of the primary state machine;
   prior to updating a state of the secondary state machine in response to the secondary state machine transition message, determining, by the one or more processors, that the incremented version number of the primary state machine is older than a current version of the secondary state machine, wherein the incremented version number of the primary state machine corresponds to an instance of locking the primary state machine using a first lock protocol, and wherein the current version of the secondary state machine corresponds to an instance of locking the secondary state machine using a second lock protocol, the second lock protocol being less restrictive than the first lock protocol; and
   in response to the determining that the incremented version number of the primary state machine is older than the current version of the secondary state machine, preventing, by the one or more processors, the state of the secondary state machine from being updated.

2. The computer-implemented method of claim 1, further comprising:
   receiving, using the one or more processors, a request for information regarding a state of the particular transaction at an instance in time the request is received;
   retrieving, using the one or more processors and by state machine query circuitry of a networked device within the distributed transaction processing system, state information from the secondary state machine; and
   returning, using the one or more processors and by communications circuitry of the networked device within the distributed transaction processing system, the retrieved state information.

3. The computer-implemented method of claim 1, wherein the secondary state machine transition message comprises an Advanced Messaging Queueing Protocol (AMQP) compliant message.

4. The computer-implemented method of claim 1,
   wherein updating the state of the primary state machine comprises:
      locking, using the one or more processors, the primary state machine using a serializable isolation level lock before transitioning the state of the primary state machine; and
      releasing, using the one or more processors, the serializable isolation level lock on the primary state machine after causing transmission of the secondary state machine transition message;
   in response to updating the state of the primary state machine indicated by receipt of the secondary state machine transition message from a message queue, processing, using the one or more processors, the secondary state machine transition message by:
      locking, using the one or more processors, the secondary state machine, the secondary state machine having a schema identical to that of the primary state machine, wherein the secondary state machine is also associated with the particular transaction and the secondary state machine is configured for locking using a less restrictive lock protocol than the serializable isolation level lock used to lock the primary state machine;
      retrieving, using the one or more processors, from the secondary state machine transition message, the version number of the primary state machine;
      retrieving, using the one or more processors, from the secondary state machine, the version number of the secondary state machine;
      comparing, using the one or more processors, the version number of the primary state machine to the version number of the secondary state machine to generate a comparison result;
      performing a secondary state machine update operation based on the comparison result; and
      releasing, using the one or more processors, a lock on the secondary state machine;
   wherein the less restrictive lock protocol comprises a read-committed isolation level lock;
   wherein locking the secondary state machine comprises locking, using the one or more processors, the secondary state machine using the read-committed isolation level lock; and wherein releasing the lock on the secondary state machine comprises releasing, using the one or more processors, the read-committed isolation level lock on the secondary state machine.

5. The computer-implemented method of claim 4, wherein a version of the primary state machine is older than the current version of the secondary state machine in an instance in which the version number of the primary state machine is less than or equal to the version number of the secondary state machine.

6. The computer-implemented method of claim 4, wherein, in an instance in which the version number of the primary state machine is greater than the version number of the secondary state machine but not in sequential order, performing a secondary state machine update operation comprising:
re-queueing, using the one or more processors, the secondary state machine transition message.

7. The computer-implemented method of claim 4, wherein, in an instance in which the version number of the primary state machine is greater than the version number of the secondary state machine and in sequential order, performing a secondary state machine update operation comprising:
transitioning, using the one or more processors, the state of the secondary state machine based on the secondary state machine transition message.

8. The computer-implemented method of claim 1, wherein the primary state machine and the secondary state machine are modelled by a relational database management system (RDBMS).

9. The computer-implemented method of claim 1, further comprising:
discarding the secondary state machine transition message in response to the determining that the incremented version number of the primary state machine is older than the current version of the secondary state machine.

10. The computer-implemented method of claim 1, further comprising:
updating, by the one or more processors, the state of the secondary state machine when the incremented version number of the primary state machine is determined to be newer than the current version of the secondary state machine.

11. A system for providing throughput in a distributed transaction processing system, the system comprising:
one or more processors; and
one or more memories storing processor-executable instructions, that, when executed by the one or more processors, cause the one or more processors to perform operations comprising:
receiving information regarding a change in state of a particular transaction recorded by the distributed transaction processing system;
updating, based on the received information, a state of a primary state machine associated with the particular transaction by:
transitioning the state of the primary state machine based on the received information regarding the change in state of the particular transaction;
incrementing a version number of the primary state machine; and
causing transmission of a secondary state machine transition message to a secondary state machine, wherein the secondary state machine transition message includes an indication of the incremented version number of the primary state machine;
prior to updating a state of the secondary state machine in response to the secondary state machine transition message, determining that the incremented version number of the primary state machine is older than a current version of the secondary state machine, wherein the version number of the primary state machine corresponds to an instance of locking the primary state machine using a first lock protocol, and wherein the current version of the secondary state machine corresponds to an instance of locking the secondary state machine using a second lock protocol, the second lock protocol being less restrictive than the first lock protocol; and
in response to the determining that the incremented version number of the primary state machine is older than the current version of the secondary state machine, preventing the state of the secondary state machine from being updated.

12. The system of claim 11, wherein the operations further comprise:
receiving a request for information regarding a state of the particular transaction at an instance in time the request is received;
retrieving state information from the secondary state machine; and
returning the retrieved state information.

13. The system of claim 11,
wherein updating the state of the primary state machine comprises:
locking the primary state machine using a serializable isolation level lock before transitioning the state of the primary state machine; and
releasing the serializable isolation level lock on the primary state machine after causing transmission of the secondary state machine transition message;
in response to updating the state of the primary state machine indicated by receipt of the secondary state machine transition message from a message queue, processing the secondary state machine transition message by:
locking the secondary state machine, the secondary state machine having a schema identical to that of the primary state machine, wherein the secondary state machine is also associated with the particular transaction and the secondary state machine is configured for locking using a less restrictive lock protocol than the serializable isolation level lock used to lock the primary state machine;
retrieving from the secondary state machine transition message, the version number of the primary state machine;
retrieving from the secondary state machine, the version number of the secondary state machine;
comparing the version number of the primary state machine to the version number of the secondary state machine to generate a comparison result;
performing a secondary state machine update operation based on the comparison result; and
releasing a lock on the secondary state machine;
wherein the less restrictive lock protocol comprises a read-committed isolation level lock;
wherein locking the secondary state machine comprises locking the secondary state machine using the read-committed isolation level lock; and wherein releasing the lock on the secondary state machine comprises releasing the read-committed isolation level lock on the secondary state machine.

14. The system of claim 13, wherein a version of the primary state machine is older than the current version of the secondary state machine in an instance in which the version number of the primary state machine is less than or equal to the version number of the secondary state machine.

15. The system of claim 13, wherein, in an instance in which the version number of the primary state machine is greater than the version number of the secondary state machine but not in sequential order, performing a secondary state machine update operation comprising:
re-queueing the secondary state machine transition message.

16. The system of claim 13, wherein, in an instance in which the version number of the primary state machine is greater than the version number of the secondary state machine and in sequential order, performing a secondary state machine update operation comprising:
transitioning the state of the secondary state machine based on the secondary state machine transition message.

17. One or more non-transitory computer-readable media for providing throughput in a distributed transaction processing system, the one or more non-transitory computer-readable media storing processor-executable instructions that, when executed by one or more processors, cause the one or more processors to perform operations comprising:
receiving information regarding a change in state of a particular transaction recorded by the distributed transaction processing system;
updating, based on the received information, a state of a primary state machine associated with the particular transaction by:
transitioning the state of the primary state machine based on the received information regarding the change in state of the particular transaction;
incrementing a version number of the primary state machine; and
causing transmission of a secondary state machine transition message to a secondary state machine, wherein the secondary state machine transition message includes an indication of the incremented version number of the primary state machine;
prior to updating a state of the secondary state machine in response to the secondary state machine transition message, determining that the incremented version number of the primary state machine is older than a current version of the secondary state machine, wherein the version number of the primary state machine corresponds to an instance of locking the primary state machine using a first lock protocol, and wherein the current version of the secondary state machine corresponds to an instance of locking the secondary state machine using a second lock protocol, the second lock protocol being less restrictive than the first lock protocol; and
in response to the determining that the incremented version number of the primary state machine is older than the current version of the secondary state machine, preventing the state of the secondary state machine from being updated.

18. The one or more non-transitory computer-readable media of claim 17, wherein the operations further comprise:
receiving a request for information regarding a state of the particular transaction at an instance in time the request is received;
retrieving state information from the secondary state machine; and
returning the retrieved state information.

19. The one or more non-transitory computer-readable media of claim 17,
wherein updating the state of the primary state machine comprises:
locking the primary state machine using a serializable isolation level lock before transitioning the state of the primary state machine; and
releasing the serializable isolation level lock on the primary state machine after causing transmission of the secondary state machine transition message;
in response to updating the state of the primary state machine indicated by receipt of the secondary state machine transition message from a message queue, processing the secondary state machine transition message by:
locking the secondary state machine, the secondary state machine having a schema identical to that of the primary state machine, wherein the secondary state machine is also associated with the particular transaction and the secondary state machine is configured for locking using a less restrictive lock protocol than the serializable isolation level lock used to lock the primary state machine;
retrieving from the secondary state machine transition message, the version number of the primary state machine;
retrieving from the secondary state machine, the version number of the secondary state machine;
comparing the version number of the primary state machine to the version number of the secondary state machine to generate a comparison result;
performing a secondary state machine update operation based on the comparison result; and
releasing a lock on the secondary state machine;
wherein the less restrictive lock protocol comprises a read-committed isolation level lock;
wherein locking the secondary state machine comprises locking the secondary state machine using the read-committed isolation level lock; and
wherein releasing the lock on the secondary state machine comprises releasing the read-committed isolation level lock on the secondary state machine.

* * * * *